United States Patent [19]

Honnold et al.

[11] 3,804,993

[45] Apr. 16, 1974

[54] LOGIC CONTROLLED AUDIO TAPE INFORMATION SYSTEM

[75] Inventors: George Herbert Honnold, Middletown; Katharine Blossom Prival, Lincroft, both of N.J.

[73] Assignee: Bell Telephone Laboratories, Incorporated, Murray Hill, N.J.

[22] Filed: July 3, 1972

[21] Appl. No.: 268,541

[52] U.S. Cl. 179/100.1 PS, 35/9 A, 179/100.2 MD, 179/100.2 S, 340/174.1 C

[51] Int. Cl. ...................... G11b 15/18, G11b 23/36

[58] Field of Search............. 179/100.1 R, 100.1 PS, 179/100.1 C, 100.2 S, 100.2 MD, 100.3 B, 100.3 D; 340/174.1 C; 35/9 A

[56] References Cited

UNITED STATES PATENTS

| | | | |
|---|---|---|---|
| 3,541,271 | 11/1970 | Joslow et al. | 179/100.2 S |
| 3,194,895 | 7/1965 | Treadwell | 179/100.2 S |
| 3,294,924 | 12/1966 | Fein | 179/100.2 MD |
| 3,423,743 | 1/1969 | Silverman | 179/100.2 MP |
| 3,501,851 | 3/1970 | Prince et al. | 179/100.2 MD |
| 3,745,531 | 7/1973 | Staas | 340/174.1 C |

*Primary Examiner*—Raymond F. Cardillo, Jr.
*Attorney, Agent, or Firm*—T. Stafford

[57] ABSTRACT

An audio information system for providing information in preprogrammed segmented form includes a multifrequency tone receiver and decoder, a search and control logic circuit and a controllable tape recorder. Message segments, for example, steps of a maintenance procedure including associated corrective action steps, are recorded in serial form on an audio tape. Control signals associated with each message segment including addresses of related message segments are also recorded on the tape. Given a command and/or address the information system automatically locates and plays back the desired message segment. At the end of each message segment a choice may be made of repeating the last played segment, continuing to the next segment in the procedure, branching to a corrective action procedure or playing some other desired message segment.

9 Claims, 7 Drawing Figures

PATENTED APR 16 1974

3,804,993

LOGIC CONTROLLED AUDIO TAPE INFORMATION SYSTEM

BACKGROUND OF THE INVENTION

This invention relates to audio tape information systems and, more particularly, to audio tape systems having the capability for a subscriber to concatenate and play back prerecorded information segments in a desired format.

With the ever increasing complexity of present day equipment, maintenance procedures have also become increasingly difficult and complex. Indeed, routine maintenance, as well as corrective maintenance of modern electronics and other equipments, requires the services of highly skilled craftsmen. Even having the necessary skilled personnel, maintenance of these equipments is usually further complicated because the craftsmen must follow lengthy printed procedures, parts of which may be scattered through several volumes and/or various handbooks. Intermittent reference to such printed procedures is time consuming and also leads to errors because of inadvertent omissions and the like.

Several systems have been proposed which attempt to overcome the difficulties related to the use of printed maintenance procedures. In one such system, a fixed sequence of test procedures is recorded on audio tape for later use in a cassette type audio tape player.

In another system, a two track tape is employed to supply a test procedure in audio form. On one track of the tape, primary instructions are recorded in a fixed sequence. The second track contains secondary instructions which are recorded adjacent to and are directly associated with specific ones of the primary instructions. At the termination of a primary instruction, only the associated secondary instructions or the physically next primary instruction may be played back.

In still another system, a multitrack tape is also utilized to provide a test procedure in audio form. Individual message segments are recorded in serial form on one track of the tape. Cue signals for identifying each of the message segments are recorded on a second track. Each of the message segments has an identification number determined by its position relative to the number of cue signals on the tape. A particular message segment of interest is selected for playback by dialing the appropriate identification number. Upon termination of the selected segment, another desired message segment may be selected by dialing its identification number. This particular system allows random access to individual message segments, however, a separate number must still be dialed by an operator prior to playing back each desired segment. Thus, an operator or craftsman still must reference a list of numbers identifying message segments to be played back.

Although each of these prior systems may be satisfactory for certain applications, they are unsatisfactory for others because of the limited message formats and/or the need to dial individual numbers in order to concatenate individual message segments into a desired maintenance procedure.

SUMMARY OF THE INVENTION

It is, therefore, a general object of this invention to simplify maintenance procedures by employing an audio tape system.

Another object of the invention is to concatenate automatically prerecorded audio message segments into a desired audio program.

Still another object of the invention is to control both local and remote locations the concatenation of individual message segments into a desired audio program without a need for referring to printed materials.

These objects and other advantages are achieved in accordance with the inventive principles described herein for concatenating individual prerecorded audio message segments into a desired audio program, for example, a maintenance procedure or the like. To this end, individual message segments and associated control signals are prerecorded in serial form on an audio tape. The playback sequence of the message segments is preprogrammed in accordance with the invention by employing predetermined ones of the prerecorded control signals. The control signals are utilized to locate the individual message segments on the tape, to identify associated message segments and to otherwise control operation of the tape system.

Specifically, an audio information system in accordance with the invention includes a signal receiver, a search and control logic circuit, a controllable tape recorder and a tape record medium. The receiver is employed to detect and decode signals containing information for controlling the audio tape information system. Such signals are received from either a remote station, a local station and/or the audio tape. Signals representative of the decoded received signals are supplied to the search and control logic circuit. In turn, the logic circuit generates signals for controlling the tape recorder to locate and play back message segments in a desired format.

Control signals associated with each message segment include a beginning of segment marker, an end of segment marker and a plurality of addresses. The markers are utilized to locate the individual message segments on the tape. The addresses are utilized to identify associated message segments in accordance with a preprogrammed format. Each prerecorded address associated with the individual message segments corresponds to an externally supplied command signal. The command signals are utilized to control the audio tape system. Typical among these commands are: play message segment corresponding to an address supplied from an external source, repeat the last played segment, play next message segment in the program, or branch to another message segment, for example, a step of a maintenance corrective procedure. The control signals including the addresses are in the audio frequency range. Accordingly, all information needed for reproducing a desired preprogrammed audio program, in accordance with the invention, is readily prerecorded on the audio tape.

In operation, a program is initiated by supplying an appropriate command signal to the aduio information system. For example, a command may be supplied indicating that an address of a desired message segment is to be supplied from an external source or a command may be supplied indicating that an address of a desired message segment is to be supplied internally from the audio tape. Signals representing the external address are supplied directly to the receiver from a local control unit or from a remote control unit via a transmission link, for example, a telephone line or the like. Signals representing the internal address are supplied directly from the audio tape. The received signals are decoded and representative signals are supplied to a logic circuit. In turn, output signals from the logic circuit cause the tape recorder to start. Then, the desired message segment is located by counting the prerecorded marker signals. Once located, the message segment is played back and the audio information is supplied to an operator at the local control unit or the remote control unit. Upon termination of the message segment, the end of segment marker is detected and the tape recorder is stopped. Then, the operator may select whether to continue in the program, repeat the last played segment, or branch to a related message segment. This is achieved, in accordance with the invention, by supplying an appropriate signal to the audio information system corresponding to the desired command. Upon receiving the decoded command signal and decoded address signals, appropriate signals are generated by the logic circuit for controlling the tape recorder to effect the command. This procedure is iterated until the desired audio program has been completed.

BRIEF DESCRIPTION OF THE DRAWINGS

These and other objects and advantages of the invention will be more fully understood from the following detailed description of the invention taken in accordance with the appended drawings in which.

DETAILED DESCRIPTION

Figure 1:
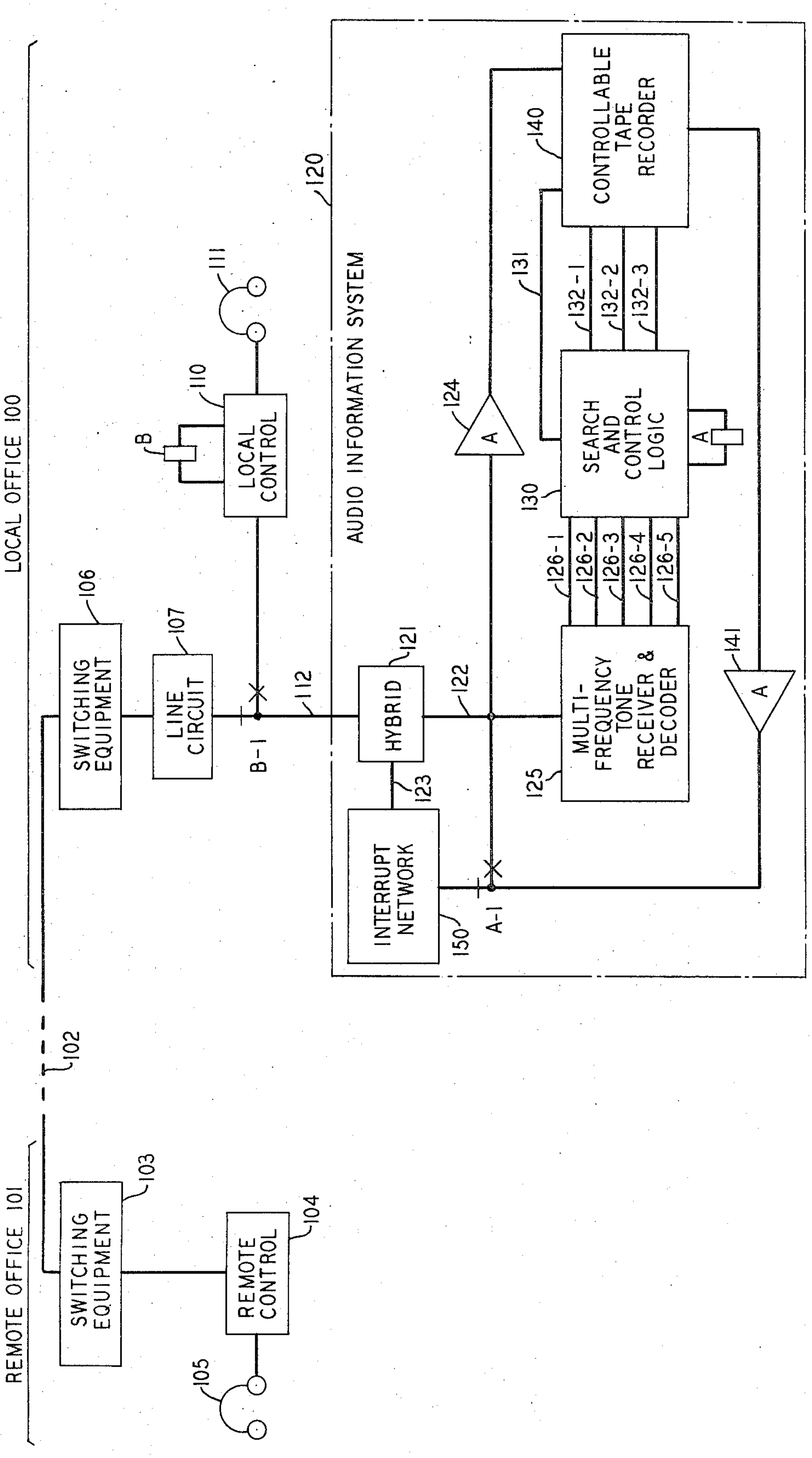
FIG. 1 depicts an audio information system illustrating the invention.

FIG. 1 depicts in simplified block schematic form an audio information system which illustrates the principles of the invention. Since it is desirable to access a single information system from both local and remote locations, local office 100 and remote office 101 are shown for purposes of illustration. Offices 100 and 101 are interconnected via transmission link 102 which, for example, is a telephone transmission line or the like. Local office 100 includes all of the equipment necessary for initiating and playing back audio message segments in a desired format and for transmitting the message segments to remote locations, for example, to remote office 101 via transmission link 102. Similarly, remote office 101 includes all of the equipment necessary for accessing the audio information system and for further controlling the playback of message segments in a desired format.

Accordingly, remote office 101 includes switching equipment 103, remote control unit 104 and associated head set 105. Switching equipment 103 is employed in well known fashion for interconnecting any one of a plurality of craftsmen, operators or subscribers with local office 100. To this end, remote control unit 104 may be interconnected with office 101, and subsequently with office 100 via a subscriber line.

Remote control unit 104 includes a signal generator (not shown) for generating signals to control information system 120 located in office 100. Preferably, the generator is a multifrequency tone generator of a type now well known in the telephone art. Specifically, control unit 104 generates 2/8 multifrequency tones commonly employed in telephone signaling to access and control audio information system 120. An operator located at remote control unit 104 receives the desired audio information via headset 105.

Local office 100 includes switching equipment 106, line circuit 107, local control unit 110, headset 111, and audio information system 120. Switching equipment 106 is employed in well-known fashion for interconnecting local office 100 to any one of a plurality of remote offices and, hence, to an operator, a craftsman or a subscriber at remote locations.

Line circuit 107 is of a conventional type and is employed to detect ringing signals, answer calls and subsequently disconnect the calls. By employing line circuit 107 the audio information system of this invention is "on line" at all times without requiring the assistance of a human operator. One such line circuit is described in Pat. No. 3,113,176 issued to T. L. Doktor on Dec. 3, 1963.

Local control unit 110 is essentially identical to remote control unit 104. Preferably, control unit 110 is also equipped to generate 2/8 multifrequency tones for accessing and controlling audio information system 120. Such local control is effected by activating relay B, thereby disconnecting line circuit 107 from circuit path 112 via break contact B-1 of relay B, and connecting control unit 110 to circuit path 112 via make contact B-1 of relay B. An operator located at local control unit 110 receives the desired audio information via headset 111. Control unit 110 may also be connected to local office 100 via a subscriber line or the like.

Audio information system 120 includes hybrid network 121 for supplying incoming signals from circuit path 112 to circuit path 122 and for supplying outgoing signals from circuit path 123 to circuit path 112 in well known fashion. Incoming signals are generally multifrequency tones utilized in controlling audio information system 120. However, voice signals are supplied when recording message segments and upon occasions when the system is employed to record messages, for example, the comments made by an operator or a craftsman during a maintenance procedure. These incoming voice signals are supplied via circuit path 122 and amplifier 124 to a record head of controllable tape recorder 140.

Incoming control signals are supplied to receiver and decoder 125 where they are detected and decoded. Such control signals may originate from a remote office, a local office or the audio tape being employed in audio information system 120.

Preferably, receiver 125 is of a multifrequency tone type now well known in the telephone art capable of detecting and decoding 2/8 multifrequency tones. Additionally, receiver 125 yields, in well known fashion, at output 126-1 a logical signal indicating that a multifrequency tone character has been received. Receiver 125 also yields logical signals at outputs 126-2 through 126-5 representative of the decoded multifrequency tones. The outputs generated by receiver 125 for each received multifrequency tone are stored for a predetermined interval. This is achieved, for example, by utilizing a flip-flop circuit in circuit with each of outputs 126 (not shown) which are reset at the termination of the desired predetermined interval in well known fashion. The stored output signals from receiver 125 represent commands and/or addresses corresponding to individual message segments stored on the audio tape employed in practicing the invention.

Figure 2:
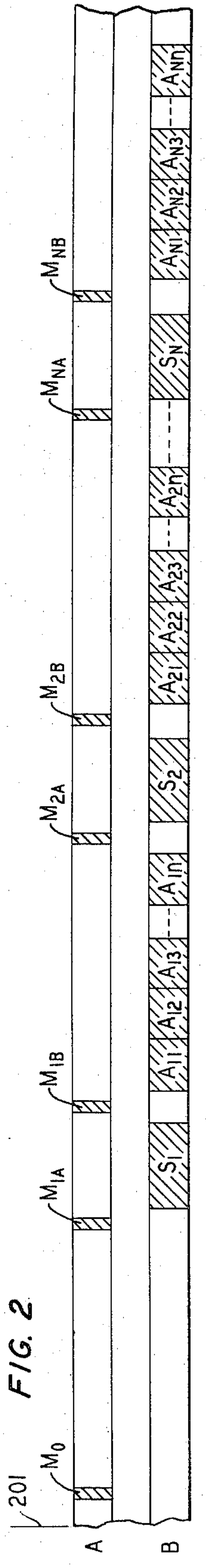
FIG. 2 depicts an audio tape in accordance with the invention.

Turning to FIG. 2, there is shown audio tape 201 containing, in accordance with the invention, a plurality of prerecorded message segments and associated control signals. In this example, not to be construed as limiting the scope of the invention, audio tape 201 includes a first audio track, A, and a second audio track, B. Tracks A and B are employed for convenience in retrieving the desired recorded information. A plurality of message segments S and associated addresses A are recorded in serial form on track B of tape 201. Marker signals identifying the beginning and end of each message segment are recorded on track A of tape 201. These marker signals are employed to locate the individual message segments and to start and stop playback of recorder 140 (FIG. 1).

In this example, each of message segments $S_1$ through $S_N$ is identified by an address representing the number of markers counted from the beginning of the tape to the message segment of interest. Each address includes three multi-frequency tone characters each being represented by four digital bits at the output of receiver and decoder 125 (FIG. 1). For example, the location of segment $S_1$ is identified by a three character address representative of numeral 1. Each of the other prerecorded message segments has a similar three character address. The location of segment $S_1$ is identified by markers $M_0$ and $M_{1A}$. A marker also identifies the end of each message segment. In this example, marker $M_{1B}$ identifies the end of segment $S_1$. Use of the markers for locating a segment of interest will be more fully described below.

A plurality of addresses are serially recorded on the tape after each message segment, for example, addresses $A_{11}$ through $A_{1n}$ associated with message segment $S_1$. These addresses also include three digital characters which are represented by multifrequency tones prerecorded on track B of tape 201. Addresses A contain information for further controlling the operation of the audio information system so that an operator, in accordance with the invention, can concatenate a desired preprogrammed audio program directly from prerecorded information on tape 201. For brevity and clarity of description only three addresses are assumed to be associated with each of the prerecorded message segments.

Accordingly, upon termination of a selected message segment, for example, segment $S_1$, there are three prerecorded addresses, namely $A_{11}$, $A_{12}$ and $A_{13}$. Addresses $A_{11}$ contains multifrequency tones identifying the next message segment in the audio program. The next related message segment is not necessarily the physically next segment recorded on the tape. Addresses $A_{12}$ contains multifrequency tones identifying a related message segment which is not necessarily the next one in the audio program. For example, address $A_{12}$ may identify a corrective action procedure in a maintenance sequence which is referred to only when a test procedure indicates that the equipment is out of tolerance. Finally, address $A_{13}$ contains multifrequency tones identifying the last played segment in the sequence. Thus, after each message segment has been played, an operator or craftsman has a choice to play the next segment in the sequence, play a related message segment or repeat the last played segment.

Figure 3:
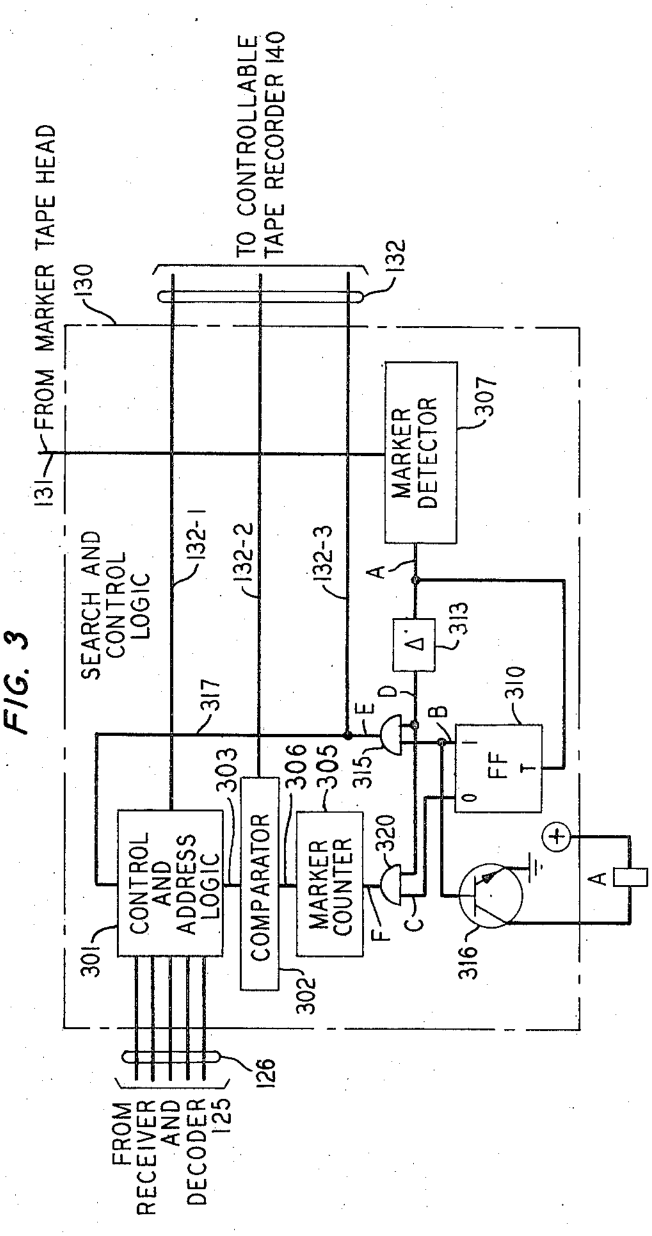
FIG. 3 depicts details of the search and control logic circuit of FIG. 1.
Figure 5:
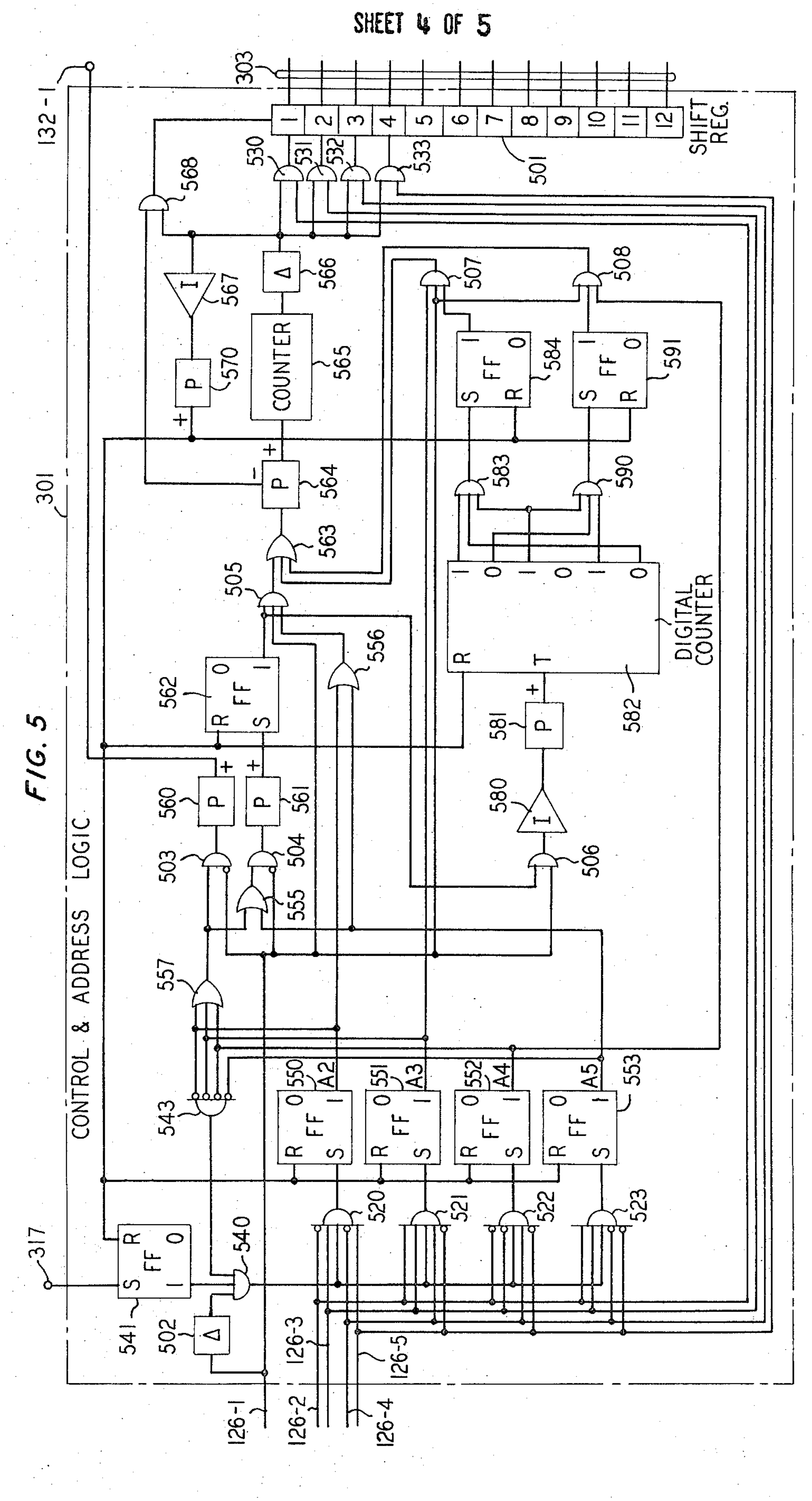
FIG. 5 shows details of the control and address logic circuit of FIG. 3.

Returning now to FIG. 1, outputs 126-1 through 126-5 of receiver and decoder 125 are supplied to search and control logic 130 for generating signals to control tape recorder 140. Accordingly, search and control logic 130 generates signals at outputs 132-1, 132-2 and 132-3 which cause tape recorder 140 to start, stop, rewind, transport forward and play. A tape recorder which responds to such control signals for playing back selected message segments is described in Pat. No. 3,541,271, issued to D. L. Joslow and J. J. Bosnak on Nov. 17, 1970. Signals representative of the markers recorded on the audio tape employed in practicing this invention are supplied from the marker track tape head (not shown) of recorder 140 via circuit path 131 to search and control logic 130. Details of search and control logic 130 are shown in FIGS. 3 and 5 to be described in more detail below.

Audio information in the message segments being played back is supplied via amplifier 141 and break contact A-1 of relay A to interrupt network 150 and, then, via circuit path 123 and hybrid 122 to circuit path 112. From circuit path 112 the outgoing audio information is supplied to local control unit 110 or remote control unit 104.

Interrupt network 150 is employed to provide a "two-way" voice channel so that a voice frequency path exists in both the incoming and outgoing direction of audio information system 120 at all times. Such a two-way channel is required in order to control audio information system 120 from either local control 110 or remote control 104, while receiving the desired audio information. In order to achieve a full time two-way voice channel, multifrequency tone receiver and decoder 125 must be protected against "digit simulation". That is to say, provisions are provided via interrupt network 150 so that receiver 125 is not "talked-off" by reflections of outgoing signals. Details of an interrupt network which may be utilized in practicing this invention are described by R. R. Campbell, G. H. Honnold and M. Lefkowitz in copending application Ser. No. 205,805, filed Dec. 8, 1971 now U.S. Pat. No. 3,715,518 issued Feb. 6, 1973.

During instances when the prerecorded addresses are being employed to control information system 120 relay A is activated, so that the multifrequency tones from tape recorder 140 are supplied to receiver 125 via make contact A-1 of relay A. Operation of relay A is described in greater detail below in conjunction with FIG. 3.

Figure 4:
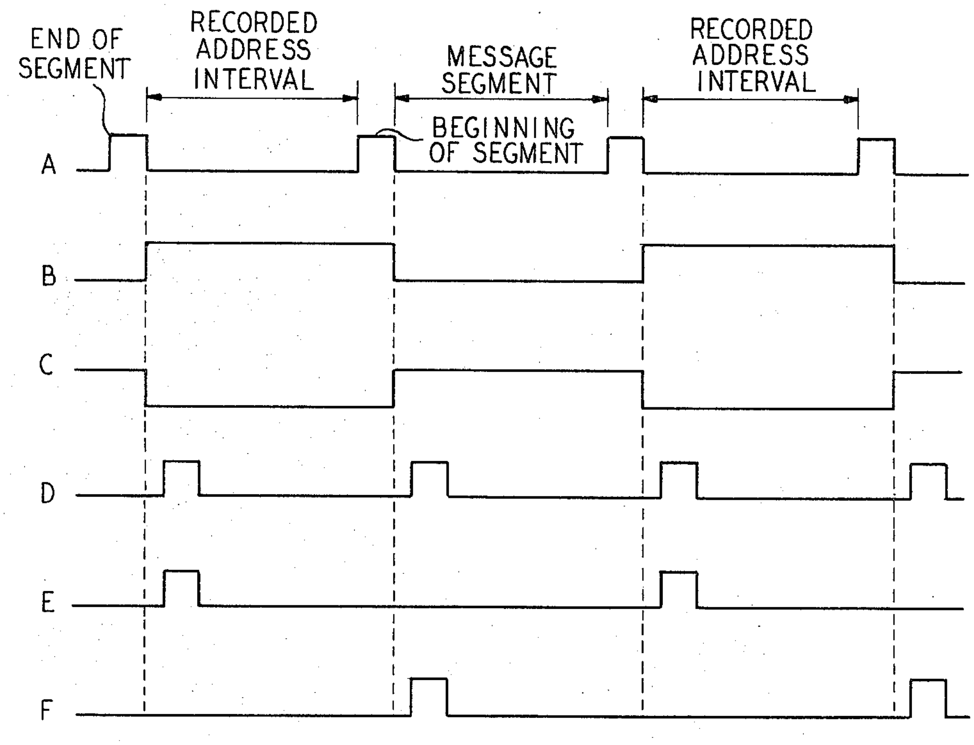
FIG. 4 shows waveforms useful in describing the operation of the search and control logic circuit of FIG. 3.

FIG. 3 shows details of search and control logic 130 utilized in information system 120. For brevity and clarity of description the operation of search and control logic 130 relating only to utilizing the prerecorded marker signals for locating individual message segments on the audio tape shall be described in connection with FIG. 3. FIG. 4 shows a sequence of waveforms of signals developed at circuit points in FIG. 3. The waveforms of FIG. 4 have been labeled to correspond to the circuit points indicated in FIG. 3.

Accordingly, retrieval of a message segment is initiated by supplying logical signals representative of an address of the desired message segment from receiver 125 to control and address logic 301. Details of control and address logic 301 are shown in FIG. 5 to be discussed below. For brevity it is sufficient to state that control and address logic 301 supplies logical signals via circuit path 303 to comparator 302 representing the address of a desired message segment. In practice, circuit path 303 may include a plurality of circuit paths. The address of a desired message segment is compared to the logical signal output supplied from marker counter 305 via circuit path 306 to comparator 302. Circuit path 306 may also include a plurality of circuit paths.

When the signals supplied to comparator 302 are identical, the desired message segment has been located and is played back. However, when the signals are not identical, comparator 302 generates a signal for controlling tape recorder 140 (FIG. 1) to locate the segment of interest. This control signal is supplied via circuit path 132-2 and activates the transport control of tape recorder 140 to initiate a search for locating the desired message segment. For this purpose, marker signals recorded on track A of tape 201 (FIG. 2) are supplied via circuit path 131 to marker detector 307. The detected marker signals, as shown in waveform A of FIG. 4, are supplied to the toggle input of flip-flop 310 and to delay unit 311. Signals developed at the 1 output of flip-flop 310, as shown in waveform B of FIG. 4, are supplied to a first input of AND gate 315 and to the base terminal of transistor 316. Thus, relay A is activated via transistor 316 during intervals when a high state signal is developed at the 1 output of flip-flop 310. This allows the prerecorded address signals to be supplied to multifrequency receiver 125.

Signals developed at the 0 output of flip-flop 310, as shown in waveform C of FIG. 4, are supplied to a first input of AND gate 320. The delayed marker signals from delay unit 313, as shown in waveform D of FIG. 4, are supplied to a second input of AND gates 315 and 320. AND gate 315 generates a pulse signal, as shown in waveform E of FIG. 4 which, in turn, is supplied via circuit path 317 to control and address logic 301 for purposes to be discussed below in conjunction with FIG. 5. The output of AND gate 315 is also supplied to tape recorder 140 via circuit path 132-3 for stopping the tape recorder at the termination of a message segment. Signals generated at the output of AND gate 320, as shown in waveform F of FIG. 4, are supplied to marker counter 303. The marker signal count stored in marker counter 303 identifies the message segments on audio tape 201 (FIG. 2). Once an appropriate number of the markers has been counted, representing the address supplied to comparator 302, the desired message segment has been located and is played back. Apparatus which employs a comparator and marker counter arrangement for locating individual message segments on an audio tape essentially identifcal to that described above, is described in greater detail in Pat. No. 3,541,271 cited above.

FIG. 5 shows in simplified block form, details of control and address logic 301 of FIG. 3. As stated above, control and address logic 301 responds to output signals supplied via circuit paths 126 for receiver 125 (FIG. 1) for supplying logical signals representative of addresses of desired message segments to comparator 302 and for controlling tape recorder 140 to initiate searches for the message segments of interest. This is achieved, in accordance with the invention, by supplying command signals to logic circuit 301 representative of a desired function, followed by signals representative of the address of a desired message segment. Command signals are supplied from external control units while address signals related to selected commands are supplied, in accordance with the invention, from the audio tape and/or the external control units.

Accordingly, a signal indicating that a multifrequency tone has been achieved is supplied via circuit path 126-1 to initialize control and address logic 301. Signals representative of received address characters or other commands are supplied via circuit paths 126-2 through 126-5 to control and address logic 301.

As stated above, commands may include that: the program is to continue, i.e., play next message segment in program; a related message segment is to be played, e.g., branch to a corrective action program; the last played message segment is to be repeated, i.e., backspace; or a desired address is to be entered from either remote control unit 104 (FIG. 1) or local control unit 110. Numerous logical signal code combinations may be employed for supplying the commands the logic circuit 301. In this example, not to be construed as limiting the scope of the invention, the following logical signal code combinations are employed:

| Command | 2/8 Multi-frequency Tones | Logical Signals Circuit Path 126-2, 3, 4, 5 |
|---|---|---|
| Continue Program | * | 0 1 0 1 |
| Branch | 7 | 1 1 1 0 |
| Repeat Segment | 4 | 0 0 1 0 |
| External Address | 3 | 1 1 0 0 |

Loading of logical signals to shift register 501 is initiated by supplying a signal representative of a received character, CD, via circuit path 126-1 to delay unit 502, to an inhibit input of AND gates 503 and 504 and to one input of AND gates 505, 506, 507 and 508. Signal CD disables AND gates 503 and 504 while enabling AND gates 505, 506, 507 and 508. Similarly, logical signals representative of decoded multifrequency tone characters representative of addresses and/or commands are supplied via circuit paths 126-2 through 126-5 to individual inputs of AND gates 520, 521, 522 and 523. Signals supplied via circuit paths 126-2, 126-3, 126-4 and 126-5 are also supplied to a first input of AND gates 530, 531, 532 and 533, respectively. AND gates 530 through 533 are employed for supplying logical signals representative of an address of a desired message segment to shift register 501 to be discussed below.

Each one of AND gates 520 through 523 is arranged to respond only to a predetermined code of the logical signals supplied via circuit paths 126-2 through 126-5 corresponding to an individual command. Specifically, AND gate 520 responds to command signals indicating that the program is to continue, namely to logical signals representative of the 2/8 multifrequency tone "*", for generating a high state signal at its output. AND gate 521 is arranged to respond to command signals indicating to branch to another message segment, namely to logical signals representative of the 2/8 multifrequency tone 7 for generating a high state signal at its output. AND gate 522 responds to command signals indicating that the last played segment is to be repeated, namely, to logical signals representative of the 2/8 multifrequency 4, for generating a high state signal at its output. Finally, AND gate 523 is arranged to respond to command signals indicating that an external address is being supplied, namely, to logical signals representative of the 2/8 multifrequency tone 3, for generating a high state signal at its output.

The outputs of AND gates 520 through 523 are supplied in a one-to-one relationship to the set inputs of flip-flops 550, 551, 552 and 553. Flip-flops 550 through 553 are employed to store signals representative of the received command to be utilized in effecting the loading of shift register 501. AND gates 520 through 523 are disabled until a high state signal is generated at the output of AND gate 540. This insures that only command signals are supplied to set flip-flops 550 through 553. Similarly, AND gate 540 is disabled until enabling pulse signals are simultaneously supplied via delay unit 502, flip-flop 541 and AND gate 543. Unit 502 delays character signal CD by a predetermined interval to insure that the command signals have been supplied to AND gates 520 through 523. Flip-flops 541 is set by a "begin" signal supplied via circuit path 317 from AND gate 315 (FIG. 3) and is reset upon termination of the search.

Signals developed at the 1 outputs of flip-flops 550 through 553 are supplied to inhibit inputs of AND gate 543. Accordingly, once a high state signal appears at any of the outputs of flip-flops 550 through 553, a low state signal is developed at the output of AND gate 543, thereby disabling AND gate 540 which, in turn, disables each of AND gates 520 through 523 until flip-flops 550 through 553 are reset. Said another way, the inputs to flip-flops 550 through 553 are inhibited until another command signal is received.

Signals developed at the 1 output of flip-flop 550 are also supplied to one input of OR gate 557 and to one input of OR gate 556. Signals developed at the 1 output of flip-flops 551 and 552 are supplied to individual inputs of OR gate 557. The output of OR gate 557 is supplied to a second input of AND gate 503 and to a second input of OR gate 555. In turn, the output of OR gate 555 is supplied to a second input of AND gate 504.

AND gates 503 and 504 are employed in conjunction with pulser circuits (P) 560 and 561, respectively, for generating signals to control playing back of addresses recorded along with message segments on audio tape 201 (FIG. 2) and for enabling loading of an address into register 501, respectively. AND gates 503 and 504 inhibit the playback and address enable functions, respectively, until the termination of each received character signal CD. This insures that the command signals have been read into an appropriate one of flip-flops 550 through 553 prior to playing back prerecorded addresses or entering externally supplied addresses.

Figure 6:
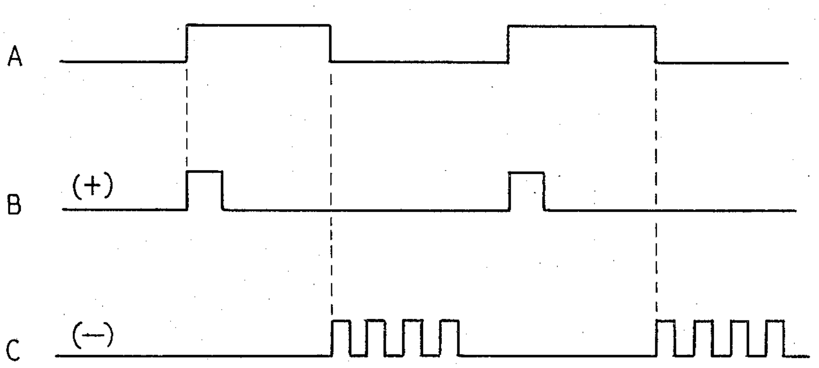
FIG. 6 shows waveforms useful in describing the operation of the pulser circuits (P) of FIG. 5.

Pulsers 560 and 561 may be any of numerous circuits known in the art capable of generating predetermined pulse patterns. Referring briefly to FIG. 6, there are shown waveforms of desired pulse signals. Accordingly, pulser circuits P employed in practicing this invention respond to a pulsating signal, as shown in waveform A of FIG. 6, to generate a pulse signal at their positive (+) output, as shown in waveform B of FIG. 6, and to generate a series of pulse signals at their negative (−) output, as shown in waveform C of FIG. 6.

Returning to FIG. 5, the positive (+) output of pulser 560 is supplied via circuit path 132-1 to recorder 140 (FIG. 1). Thus, when a high state signal is developed at a 1 output of either of flip-flops 550, 551, or 552 a pulse signal generated by pulser 560 upon termination of character signal CD is supplied to recorder 140 to commence playback. This allows the prerecorded multifrequency tones representative of addresses to be supplied from tape 201 (FIG. 2) to receiver 125 (FIG. 1) and, in turn, to logic circuit 301 via circuit paths 126-1 through 126-5.

When a high state signal is developed at the 1 output of flip-flop 553, an address is to be supplied externally from either local control unit 110 (FIG. 1) or remote control unit 104. Accordingly, playback of addresses from tape 201 (FIG. 2) is not enabled in this instance.

A high state signal developed at a 1 output of any one of flip-flops 550 through 553 enables loading of an address into shift register 501 by setting flip-flop 562 via the output of pulse 561 upon termination of character signal CD. In turn, the high state signal generated at the 1 output of flip-flop 562 is supplied to enable AND gates 505 and 506.

When a high state signal is developed at the 1 output of either flip-flop 550 or 553, a high state signal is developed at the output of AND gate 505 upon receiving the next character signal CD. This indicates that the next three received multifrequency tone characters represent the address to be read into register 501. Accordingly, upon receiving the next character signal, the high state output of flip-flops 550 or 553 is supplied via OR gate 556 and AND gate 505 to OR gate 563. In turn, the output of OR gate 563 is supplied to the input of pulser 564. Pulser 564 responds to the leading edge of the output of OR gate 563 to generate a signal pulse signal at its positive (+) output (FIG. 6B) and to the trailing edge of the output of OR gate 563 to generate a series of four pulse signals at its negative (−) output (FIG. 6C).

The positive output of pulser 564 is supplied to count-to-three circuit 565. Count-to-three circuit 565 responds, in a well known fashion, to a first received pulse signal from pulser 564 to generate a high state signal at its output. Thereafter, circuit 565 remains in a high state until a third pulse signal has been received at which time it switches back to a low state. The high state output of circuit 565 is supplied via delay circuit 566 to a second input of AND gates 530 through 533, to inverter 567 and to a first input of AND gate 568. The high state output of circuit 565 enables AND gates 530 through 533. In turn, the logical signals representative of the first received character of an address are supplied via circuit paths 126-2 through 126-5 and AND gates 530 through 533 into stages 1 through 4 of register 501, respectively.

Upon termination of character signal CD, representative of the first received address character, a series of four pulse signals are generated at the negative (−) output of pulse 564 which are supplied via AND gate 568 to shift register 501. Accordingly, the logical signals representative of the first character of the supplied address are advanced from stages 1 through 4 to stages 5 through 8 of register 501.

The above process is repeated upon receiving the second character of the supplied address and will not again be described in detail. Therefore, logical signals representative of the second character of the supplied address are read into stages 1 through 4 of register 501. Upon termination of the second character signal, the logical signals representative of the first and second characters of the supplied address are advanced to stages 5 through 12 of register 501.

In response to the third received character of the supplied address pulser 564 again generates a pulse signal at its positive (+) output which causes the output of count-to-three circuit 565 to switch from a high state to a low state. This change of state is delayed via delay circuit 566 from being supplied to AND gates 530 through 533 and inverter 567 to insure that the logical signals representing the third character are read into stages 1 through 4 of register 501 and to insure that a reset signal is not prematurely generated, repsectively. The delay interval of delay circuit 566, however, is set at a predetermined value so that AND gate 568 is disabled prior to the generation of the register advance pulse signals at the negative output (−) of pulser 564. Said another way, the delay interval is set at a value to inhibit advancing register 501 once the entire address has been read in.

The delayed output of count-to-three circuit 565 is also supplied via inverter 567 to pulser 570. In turn, the positive output of pulser 570 is employed to begin a search for the desired message segment represented by the address stored in register 501 and for resetting appropriate stages of logic circuit 301 for the purpose of accepting the next command and address signals.

Thus, logical signals are stored in register 501 representing either an externally supplied address or the first prerecorded address associated with a message segment, for example, address $A_{11}$ after segment $S_1$ on tape 201 (FIG. 2). Subsequently, the stored logical signals are supplied from register 501 via circuit paths 303 to comparator 302 (FIG. 3). Comparator 302 generates signals for operating tape recorder 140 (FIG. 1) for locating the desired message segment.

Command signals are also supplied to logic circuit 301 indicating that either the second or third prerecorded address is to be read into register 501. On such instances, the operation of logic circuit 301 for effecting playback of the prerecorded addresses and for enabling loading of the address is identical to that described above and, thereofre, will not again be described in detail. The primary difference between reading either the first, second or third address into register 501 concerns timing of the intervals when AND gates 530 through 533 are enabled.

Now, assume that logical signals representing the second prerecorded address are to be read into register 501. This is effected by first supplying the appropriate multifrequency tone representing the desired command via control unit 110 or 104 (FIG. 1) and receiver 125 (FIG. 1) to logic circuit 301. In this instance, 2/8 multifrequency tone 7 is supplied indicating the selection of a corrective action procedure. This function is commonly referred to as branching.

In response to logical signals representative of multifrequency tone 7, AND gate 521 (FIG. 5) generates a high state signal which is supplied to the set input of flip-flop 551. Consequently, a high state signal is generated at the 1 output of flip-flop 551. This high state signal is employed to initiate playing back of the prerecorded addresses and to enable loading of the desired address into register 501 as described above. Accordingly, flip-flop 562 is set to yield a high state signal at its 1 output which, in turn, is supplied to one input of AND gate 506. Signals indicating that multifrequency characters have been received are supplied to the other input of AND gate 506. Thus, AND gate 506 responds to the received character signals and the output of flip-flop 562 to generate high state signals which are supplied via inverter 580 to pulser 581. Inverter 580 is employed so that pulser 581 is triggered at the termination of each received multifrequency character signal. In turn, the positive (+) output of pulser 581 is supplied to the toggle input of counter 582. Counter 582 is a conventional 3-stage digital counter and is employed to count the number of received character signals.

In this example, logical signals representative of the second prerecorded address are to be read into register 501, for example, address $A_{12}$ associated with segment $S_1$ (FIG. 2). This is achieved, in part, by supplying high state signals from appropriate outputs of counter 582 to the inputs of AND gate 583 at the termination of the third received character signal. This indicated that the next three supplied multifrequency characters represent the address to be read into register 501. In response to the high state output of counter 582, AND gate 583 generates a high state signal which, in turn, sets flip-flop 584 to generate a high state signal at its 1 output. The high state output of flip-flop 584 is also supplied to AND gate 507. Hence, high state signals are now being supplied to two of the three inputs of AND gate 507. Thus, a high state signal supplied to the third input causes the output of AND gate 507 to switch to a high state. This occurs when the next multifrequency tone character is received, i.e., the fourth prerecorded character, for example, the first character of address $A_{12}$ associated with message segment $S_1$ on tape 201 (FIG. 2). Upon receiving the fourth multifrequency character, AND gate 507 generates a high state signal which, in turn, is supplied via OR gate 563 to pulser 564. Count-to-three circuit 565 responds to the output of pulser 564 to generate a high state signal which enables AND gates 530 through 533 to supply logical signals representing the fourth through sixth prerecorded address characters to register 501. Hereafter, operation of logic circuit 301 for reading the logical signals representative of the characters of the second prerecorded address is identical to that described above concerning the externally or first prerecorded address and, therefore, will not be described again.

Now, assume that it is desired to repeat the last played message segment. That is to say, the third prerecorded address is to be read into register 501, for example, address $A_{13}$ associated with message segment $S_1$ (FIG. 2). This is achieved by supplying an appropriate command signal, namely, 2/8 multifrequency tone 4 to receiver 125. Accordingly, logical signals representing multifrequency tone 4 are supplied to the inputs of AND gate 522. The output of AND gate 522 sets flip-flop 552 to generate a high state signal at its 1 output. In turn, the high state output of flip-flop 552 is supplied to one input of AND gate 508 and is supplied via OR gate 557 and AND gate 503 and via OR gate 555 and AND gate 504 to activate the playback and address enable functions, respectively. Again, the number of received character signals are counted via digital counter 582 and high state signals are supplied from appropriate outputs of counter 582 to the inputs of AND gate 590 after the termination of the sixth prerecorded multifrequency character. This causes a high state signal to be developed at the output of AND gate 590 which, in turn, is supplied to the set input of flip-flop 591. Flip-flop 591 generates a high state signal at its 1 output which is supplied to a second input of AND gate 508. Accordingly, AND gate 508 is enabled to pass the next received character signal via OR gate 563 to pulser 564. Count-to-three circuit 565 responds to the output from pulser 564 to generate a high state signal which enables AND gates 530 through 533 to supply logical signals representing the seventh through ninth prerecorded characters to register 501. Hereafter, operation of logic 301 for reading into register 501 the logical signals representative of the characters of the third prerecorded address is identical to that described above concerning the externally supplied or first prerecorded address and, therefore, will not be described again.

In practice, message segments, for example, steps of a maintenance procedure, are serially recorded on an audio tape. Such maintenance procedures usually include both test procedures and corrective action procedures relating to a specific family of equipment. The individual steps of the test and corrective action procedures are not necessarily in sequential order on the tape. For example, one corrective action procedure may be equally applicable to several test procedures. Some of the steps of test procedures are required for certain models of the equipment and not for other models. However, as described above, the relationship of different message segments is preprogrammed, in accordance with the invention, by employing addresses which are also prerecorded on the audio tape.

Figure 7:
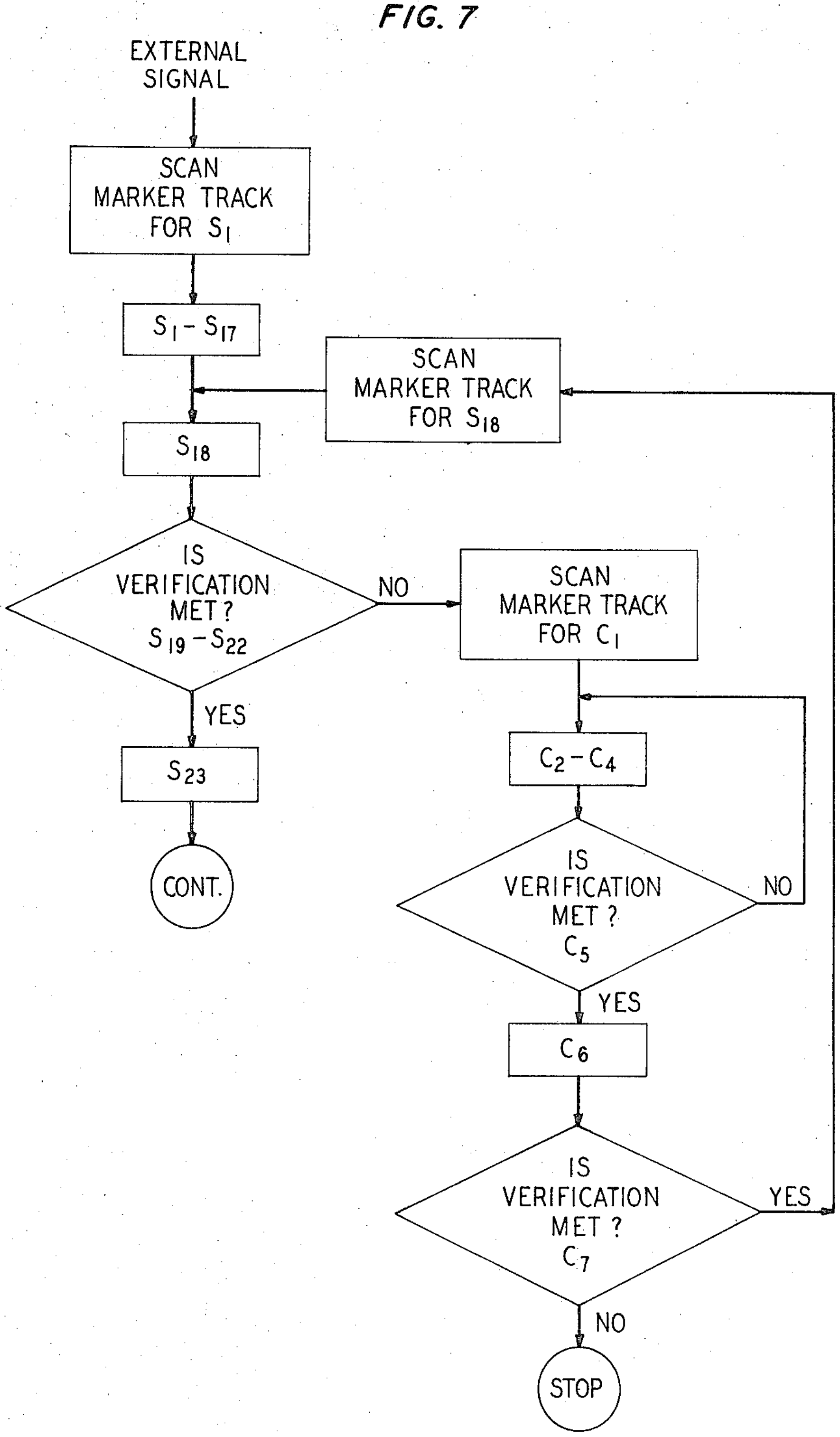
FIG. 7 depicts a functional flow diagram illustrating operation of the invention.

FIG. 7 shows a functional flow diagram illustrating a typical maintenance routine. Accordingly, a craftsman or other operator initiates playing back the maintenance routine by supplying an appropriate command signal and, then, an address of a desired message segment via control unit 110 or 104 (FIG. 1) to audio information system 120. The desired message segment, for example, segment $S_1$ is located by scanning the marker track of audio tape 201 (FIG. 2). Once located, message segment $S_1$ is played back. The selected maintenance routine may call for adjusting or setting a plurality of parameters, for example, those described in message segments $S_1$ through $S_{18}$ prior to making a verification test as described in message segments $S_{19}$ through $S_{22}$. Accordingly, upon termination of each of message segments $S_1$ through $S_{22}$ the craftsman supplies a continue command to the system. If the verification is met, the craftsman continues to the next step in the maintenance routine, for example, message segment $S_{23}$, by merely supplying another continue command. If verification is not met, the craftsman branches to the applicable preprogrammed corrective program procedure by supplying an appropriate multifrequency tone representing the branch command.

In either instance, i.e., continue or branch, the marker track of the audio tape is scanned to locate the next preprogrammed message segment.

In the instance of branching to a corrective action procedure, the marker track is scanned to locate corrective action procedure $C_1$. Thereafter, corrective action steps $C_2$ through $C_4$ are played back by supplying the continue command signal after each segment. If verification of the corrective action is not met in step $C_5$, a branch command is supplied which initiates repeating corrective action steps $C_2$ through $C_4$. If step $C_5$ is verified, a continue command is supplied and steps $C_6$ and $C_7$ are played back. If step $C_7$ is not verified, the test procedure is terminated and the equipment is usually replaced or otherwise put out of service. However, if corrective action step $C_7$ is verified, the craftsman supplies a continue command signal which causes the system to return to test procedure step $S_{18}$. Thereafter, the craftsman continues in the test procedure as before.

The above described arrangements are, of course, merely illustrative of the application of the principles of this invention. Numerous other arrangements may be devised by those skilled in the art without departing from the spirit and scope of the invention. For example, additional decoding units may be employed for controlling the system to perform additional functions in response to command signals. Such functions are, for example, repeat the last two played message segments, skip next segment in program, override prior command and the like. Furthermore, the invention may also be employed for other than supplying maintenance routines in audio form. Specifically, the invention is readily utilizable as a self education aide.

What is claimed is:

1. An information system which comprises:

record means having a plurality of discrete information segments recorded in serial from thereon, said record means further having a plurality of control signals associated with each of said information segments recorded thereon including signals marking the beginning and end of each of said recorded information segments and signals associated with each of said recorded information segments representative of an address of at least one related information segment;

controllable means for selectively playing back said information segments and said recorded control signals;

means for detecting and decoding supplied command signals and address signals; and control means for generating signals to operate said controllable means to play back selected ones of said information segments in a preprogrammed format, said control means including first means responsive to said marker signals and decoded address signals for generating signals to operate said controllable means for locating and playing back the information segment identified by said address, second means responsive to said end of segment marker signals for selectively interconnecting said controllable means with said detecting and decoding means, and third means responsive to a decoded command signal corresponding to said address of said at least one related information segment for generating signals to operate said controllable means to play back said recorded address signals thereby supplying said recorded address signals to said detecting and decoding means, wherein the information segments corresponding to said address are played back in response to supplied command signals in accordance with said programmed format.

2. A system as defined in claim 1 wherein said control means further includes means responsive to a predetermined one of said command signals for enabling said control means to receive signals representative of an address corresponding to a selected one of said recorded information segments from an external source.

3. An information system as defined in claim 2 wherein said first means includes means for counting said marker signals and comparator means supplied with decoded address signals and with output signals from said counting means for locating and initiating playback of information segments corresponding to said address signals.

4. An information system as defined in claim 3 wherein said recorded control signals include a plurality of addresses of related information segments, said command signals include signals corresponding in a one-to-one relationship to said recorded addresses and wherein said control means further includes means responsive to decoded command signals for supplying logical signals representative of the corresponding decoded address to said comparator means thereby to initialize location and playback of the information segment corresponding to said address.

5. An information system as defined in claim 4 wherein said control signals and command signals are multifrequency tones and wherein said detecting and decoding means is a multifrequency receiver for converting said multifrequency tones into logical signals.

6. An audio information system which comprises record means having a plurality of discrete message segments recorded in serial form thereon, said record means further having a plurality of control signals associated with each of said message segments recorded thereon including signals marking the beginning and end of each message segment and a plurality of address signals associated with each of said message segments identifying related message segments;

an incoming signal path and an outgoing signal path;

controllable means in circuit relationship with said outgoing signal path for playing back said recorded message segment and said recorded control signals;

means for detecting and decoding supplied command signals and address signals, said means being in circuit relationship with said incoming signal path and selectively in circuit relationship with said outgoing circuit path; and control means for generating signals to operate said controllable means to play back selected ones of said message segments in a preprogrammed format, said control means including first means responsive to said marker signals and decoded address signals for generating signals to operate said controllable means for locating and playing back the message segment identified by the decoded address, second means responsive to the end of segment marker of the message segment being played back to interconnect said detecting and decoding means to said outgoing signal path, and third means responsive to signals representative of a decoded command signal corresponding to one of said recorded address signals associated with the last played message segment for generating signals to operate said controllable means to play back said recorded addresses thereby supplying said recorded addresses to said detecting and decoding means, wherein the message segments identified by said addresses corresponding to the supplied command signals are played back in accordance with said preprogrammed format.

7. A system as defined in claim 6 wherein said first means includes means for counting said marker signals, and comparator means supplied with said decoded address signals and with output signals from said counting means for generating signals to operate said controllable means for locating and initiating playback of individual ones of said message segments corresponding to individual ones of said address signals.

8. A system as defined in claim 7 wherein said second means further includes means responsive to the marker signal indicating the end of a message segment being played back for stopping said controllable means, and wherein said third means further includes means for supplying decoded address signals corresponding to the supplied command signal to said comparator means.

9. A system as defined in claim 8 further including a source of command signals and address signals and means for selectively interconnecting said source with said incoming signal path.

* * * * *